INVENTOR.
ROBERT E. SCHOCK
BY F. A. Rechif
ATTORNEY

Nov. 20, 1956 R. E. SCHOCK 2,771,546

SQUELCH CIRCUIT

Filed Aug. 10, 1955 2 Sheets-Sheet 2

INVENTOR.
ROBERT E. SCHOCK
BY F. A. Rechif
ATTORNEY 2,771,546
Patented Nov. 20, 1956

2,771,546

SQUELCH CIRCUIT

Robert Eldon Schock, Riverhead, N. Y., assignor to Radio Corporation of America, a corporation of Delaware Application August 10, 1955, Serial No. 527,587

14 Claims. (Cl. 250—20)

This invention relates to a squelch circuit, and more particularly to a circuit for squelching or rendering inoperative an automatic frequency control (AFC) circuit in a receiver, in response to a decrease in the received carrier below a usable level or in response to the presence of an interfering carrier in the output of the carrier filter of the receiver. Although the invention will be described in connection with a single sideband (SSB) receiver, it is to be understood that it may have utility in other types of receivers.

In most radio receivers having AFC systems, particularly systems operated by the received carrier, it is desirable to have some automatic means for squelching the AFC operation if the level of the received signal drops into the noise, or if an interfering signal is present, in order to prevent the AFC from being operated by the noise or by the interfering signal. Some AFC squelch circuits derive the squelch voltage by rectifying the signal carrier, in which case disappearance of the carrier causes the squelch to operate. Other squelch circuits use a combination of rectified, filtered carrier and the rectified noise which appears in the carrier limiter output when the received carrier disappears from the carrier limiter. Still other squelch circuits may use only the rectified or detected noise appearing in the carrier limiter output in the absence of the carrier. The squelch circuit of the present invention is broadly of this latter type.

An object of this invention is to devise a novel type of AFC squelch circuit.

The objects of this invention are accomplished, briefly, in the following manner: in a phase comparator-type AFC system, wherein filtered and amplitude limited carrier is compared in phase with energy derived from a reference oscillator, the carrier energy is fed to the phase comparator through an amplifier tube or coupling tube. An amplitude modulation or amplitude variation detector is coupled to the output of the receiver carrier filter, this detector producing a fluctuating output whenever the carrier becomes noisy or whenever an interfering carrier appears. This fluctuating output is amplified, rectified, and the resulting direct current (D. C.) used to bias off the coupling tube, thus preventing any carrier from reaching the phase comparator and effectively squelching the AFC.

The foregoing and other objects of this invention will be better understood from the following description of an exemplification thereof, reference being had to the accompanying drawings, wherein.

Figure 1:
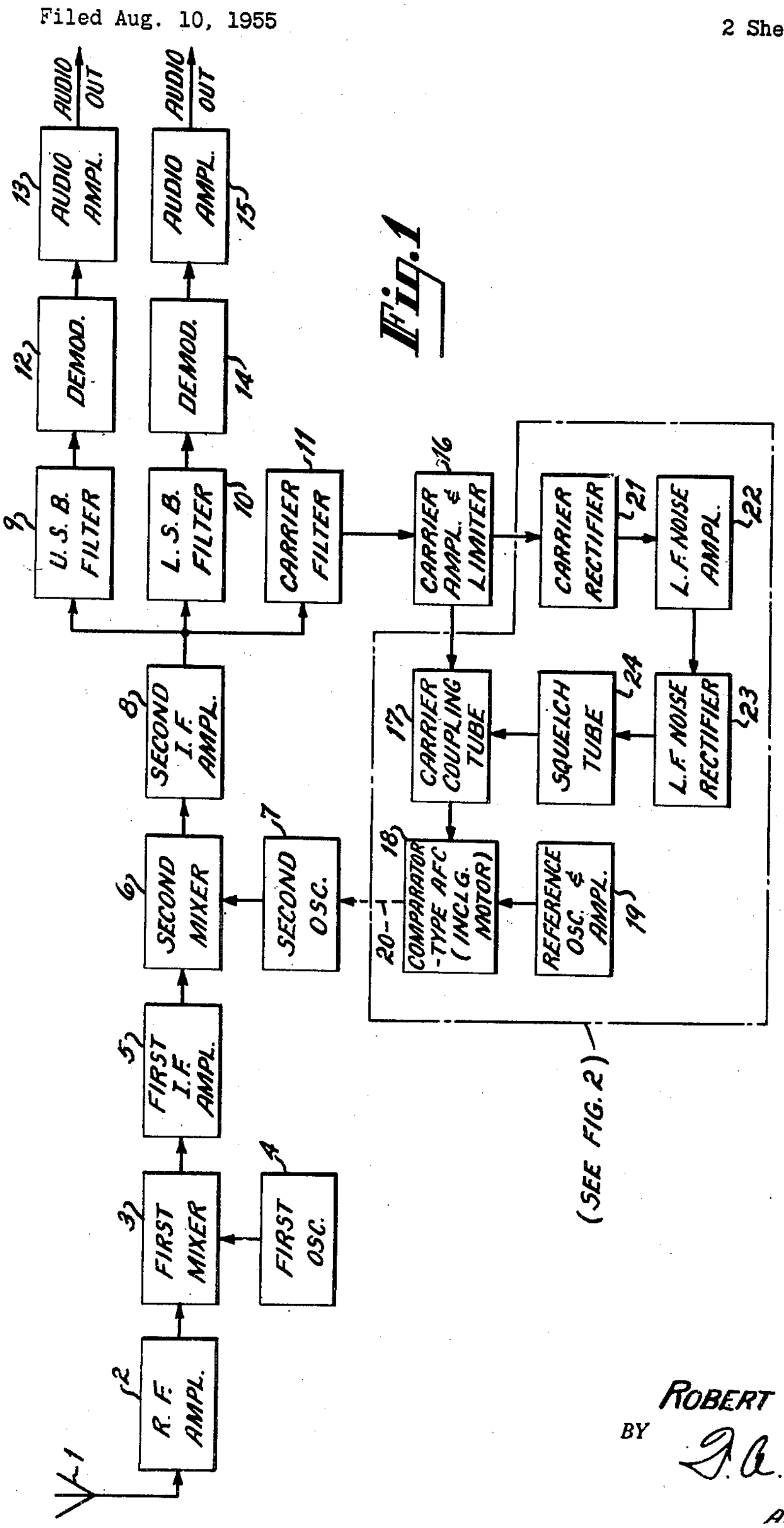
Fig. 1 is a block diagram of a receiver utilizing this invention.

Referring first to Fig. 1, signals originating at a remote point are picked up by a receiving antenna 1 and fed to the input of a radio frequency (R. F.) amplifier 2, the amplified RF signals being heterodyned in a first mixer or first detector 3 with heterodyning energy supplied from a suitable first oscillator 4. In mixer 3, the R. F. signals are heterodyned down to a first intermediate frequency (I. F.), and these I. F. signals are amplified in a first I. F. amplifier 5. The output of amplifier 5 is fed to a second detector 6, to which is also fed heterodyning energy from the controlled-frequency second oscillator 7. Oscillator 7 is the one which is controlled by the AFC system of this invention. In mixer 6, the first I. F. signals are heterodyned down to a second I. F., and these latter signals are amplified in a second I. F. amplifier 8.

The receiver illustrated may be adapted to receive SSB signals. In a practical case, it may reecive a suppressed carrier signal and two separate sideband signals, an upper sideband signal and a lower sideband signal, but such a receiver is ordinarily termed an "SSB receiver." because each of the two sideband signals may in fact carry a single, separate intelligence. In order to separate out the two sidebands and to make use of the carrier for a purpose to be hereinafter described, the output of amplifier 8 is fed jointly to the outputs of three filters, an upper sideband filter 9, a lower sideband filter 10 and a carrier filter 11. The filter 9 separates the upper sideband signal out of the composite received signal, and this upper sideband signal is applied to a demodulator 12 wherein it is demodulated for use, and the audio frequency output of demodulator 12 is fed to an audio amplifier 13 the output of which is utilized in any suitable utilization device. The filter 10 separates the lower sideband signal out of the composite received signal, and this lower sideband signal is applied to a demodulator 14 wherein it is demodulated for use, and the audio frequency output of demodulator 14 is fed to an audio amplifier 15 the output of which is utilized in any suitable utilization device.

The carrier filter 11 separates the carrier signal out of the composite received signal, and this carrier signal is passed on to a carrier amplifier and amplitude limiter device 16, wherein it is amplified and amplitude-limited to produce a filtered, amplified and amplitude-limited carrier. A portion of the output of the amplifier and limiter 16 is fed through a carrier coupling tube (amplifiers tube) 17 to one input of a comparator-type AFC unit 18, assuming that tube 17 is conductive. It will be assumed for the present that tube 17 is conductive, so that the description of the AFC system can be completed, although according to this invention a squelch or cutoff bias is at times applied to tube 17 to cut it off.

Unit 18 includes a phase comparator having two inputs one of which is supplied with filtered, amplified and limited carrier energy by way of coupling tube 17 as above described and the other of which is supplied with oscillatory energy of nominally the same frequency, from a reference oscillator and amplifier 19 of stable frequency. The comparator-type AFC unit 18 also includes an AFC tuning motor supplied from the output of the phase comparator in this same unit, and in turn driving a frequency-controlling or frequency-varying element in the second oscillator 7 by way of a mechanical connection 20. The phase comparator compares as to frequency and also phase the two oscillatory energies supplied to its two input connections, and produces an output proportional to frequency and also phase differences between the two compared energies. If the frequency of the carrier energy supplied through tube 17 to unit 18 (which frequency, as it appears at the output of amplifier 8, depends upon, among other factors, the frequency of oscillator 7) does not agree with the frequency of the energy from reference oscillator 19, or if the relative phases of these two compared energies or waves are not of the proper value for which the system is designed, the phase comparator energizes the AFC motor to tune the receiver (by tuning of oscillator 7) so that the carrier frequency will be brought to agreement in frequency and phase with the reference oscillator. This type of AFC operation is well known to those skilled in the art as a carrier-operated AFC system.

Figure 2:
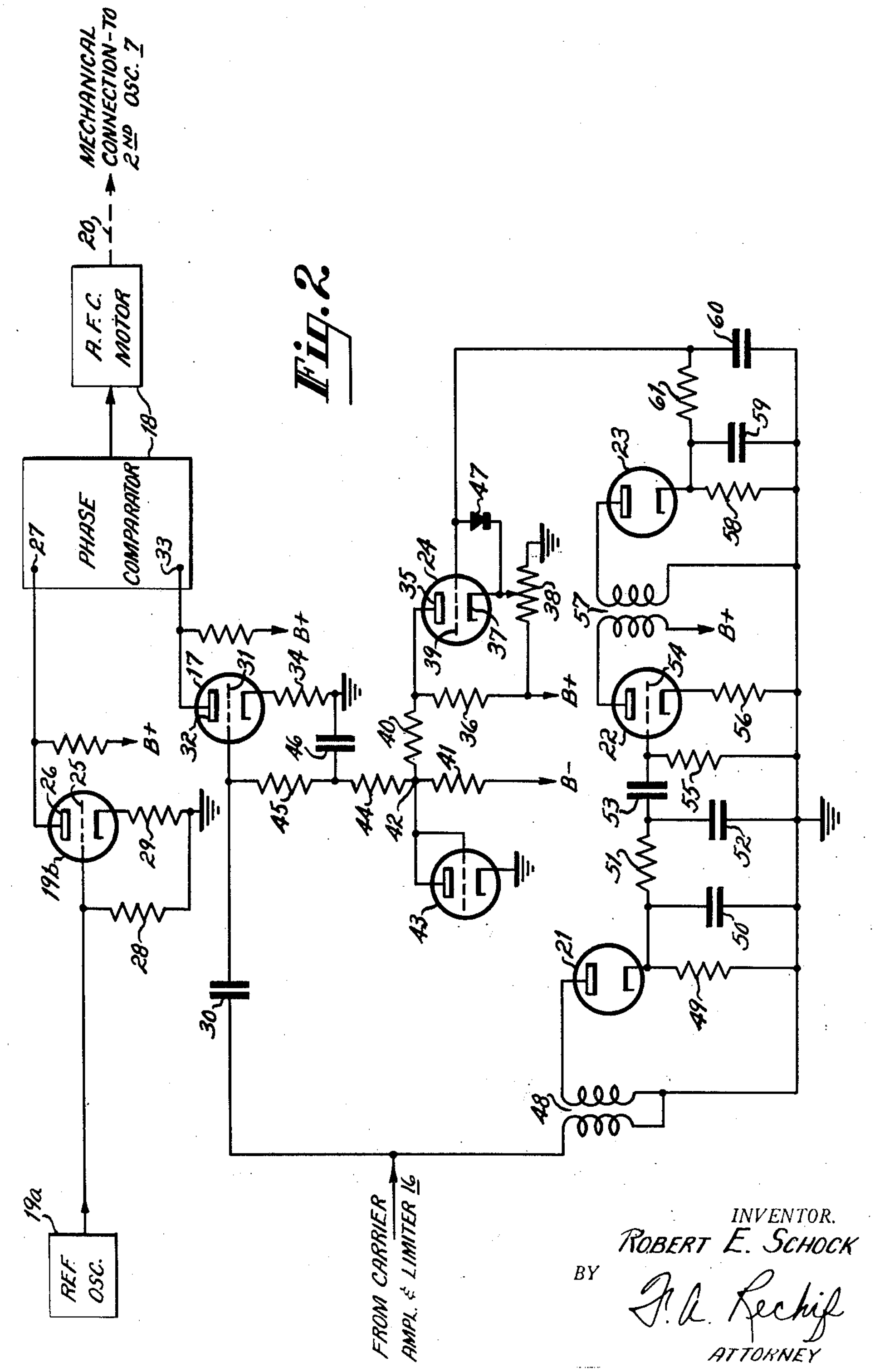
Fig. 2 is a detailed schematic of a portion of Fig. 1.

Since both the reference oscillator signal (from oscillator 19) and the carrier signal (from carrier filter 11, by way of tube 17) are required for operation of the comparator, the AFC operation may be squelched by cutting off the supply of either of these signals to the unit 18. This is done according to this invention by cutting off tube 17 automatically in response to a noisy carrier at the output of carrier filter 11 or in response to an interfering carrier at the output of this filter. A carrier rectifier 21, connected to act as an amplitude modulation or amplitude variation detector, is receptive of a portion of the output of amplifier and limiter 16. Any low frequency variations appearing in the output of rectifier 21 are amplified by a low frequency noise amplifier 22 and are rectified by a low frequency noise rectifier 23 to produce a unidirectional voltage of a predetermined polarity which acts by means of a squelch tube 24 to apply a squelch or cutoff bias to coupling tube 17, thus cutting off this tube. In this way, the signal path through tube 17 is broken and the supply of carrier signal is cut off from unit 18. The AFC is then squelched. This action will be explained more in detail in connection with Fig. 2, to which reference will now be made.

The reference oscillator 19*a* and amplifier tube 19*b*, the latter illustrated as a triode vacuum tube, together make up the reference oscillator and amplifier 19. The output of reference oscillator 19*a* is applied to the grid 25 of tube 19*b*, and the anode 26 of this tube is connected directly to one of the input terminals 27 of the phase comparator 18. Thus, the reference oscillator 19*a* feeds oscillatory energy of stable frequency to the comparator 18 through amplifier tube 19*b*. The phase comparator 18 includes an AFC tuning motor which varies the frequency of oscillator 7 by means of a mechanical connection 20. Amplifier tube 19*b* is continuously energized as long as the receiver is in operation. A conventional grid leak resistor 28 and a cathode biasing resistor 29 are provided for tube 19*b*.

A portion of the output of carrier amplifier and limiter 16 is applied through a coupling capacitor 30 to the grid 31 of the carrier coupling tube or amplifier tube 17, here shown as a triode vacuum tube. The anode 32 of tube 17 is connected directly to the other of the input terminals 33 of phase comparator 18. Thus, when tube 17 is conducting, filtered, amplified and limited carrier energy is fed from unit 16 through this tube to the phase comparator.

Before described the details of the entire AFC squelch circuit, the operation of the squelch tube 24 per se, and its effect on carrier coupling tube 17, will be described. A cathode resistor 34 is connected from the cathode of tube 17 to ground, to establish a normal operating bias for this tube. The anode 35 of squelch tube 24, illustrated as a vacuum triode, is connected through a load resistor 36 to the positive terminal B+ of a source of unidirectional potential, while the cathode 37 of this tube is connected to the movable tap on a potentiometer 38 which is connected between B+ and ground. In this way, a positive bias is placed on the cathode 37 so that, when no squelch bias is fed to the grid 39 of tube 24, this tube is cut off.

A voltage divider network, comprising three resistors 36, 40 and 41 connected in series, is connected between the positive terminal B+ and the negative terminal B— of the unidirectional potential source. The values of these resistors are made such that the plus and minus voltages divide to give zero or slightly positive voltage at the common junction point 42 of resistors 40 and 41. A diode-connected triode vacuum tube 43 has its grid and anode connected to point 42 and its cathode connected to ground. Tube 43 acts as a diode bias clamp, to keep the voltage at point 42 from going more positive than just the voltage drop across its own low impedance. The grid 31 of carrier amplifier or carrier coupling tube 17 is connected to point 42 through a pair of resistors 44 and 45. A capacitor 46 is connected from the common junction point of resistors 44 and 45 to ground, to provide a smoothing filter, along with resistor 44. Therefore, when point 42 is at essentially zero potential, tube 17 has its normal operating bias, derived across cathode resistor 34.

If a positive voltage is applied to grid 39 so that squelch tube 24 is no longer cut off, the anode current then draws through resistor 36 causes a drop of the positive potential at the junction of resistors 36 and 40. This upsets the voltage balance at junction 42 in a negative direction and this negative or cutoff bias appears on grid 31 of tube 17, so that it becomes inoperative as an amplifier. Then, with tube 17 cut off, carrier energy cannot get through to phase comparator 18. A crystal diode 47 is connected between grid 39 and cathode 37, in such a direction as to act as a bias clamp. This diode prevents the positive voltage applied to the grid 39 from going above the voltage level of its cathode 37.

It has previously been explained how squelching of the AFC occurs when a positive voltage is applied to grid 39 of the squelch tube 24, cutting off tube 17 and cutting off the supply of carrier energy to comparator 18. To generate the required positive voltage at grid 39 when the received carrier level drops into the noise, a portion of the output of the carrier amplifier and limiter unit 16 is also fed to the anode of a vacuum diode 21 connected as a carrier rectifier, through a transformer 48. Tube 21 with its associated circuit is connected to act as an amplitude modulation detector or amplitude variation detector, and for this purpose a resistor 49 and a capacitor 50 are connected in parallel between the cathode of diode 21 and ground, while a series resistor 51 and a shunt capacitor 52 act as a low-pass filter to prevent the carrier or other high frequencies from being passed on to the circuit which follows. A capacitor 53 is connected from the common junction of resistor 51 and capacitor 52 to the grid 54 of a vacuum triode 22 connected as a low frequency noise amplifier, a leak resistor 55 being connected between grid 54 and ground. A cathode resistor 56 provides self-bias for tube 22.

When normal carrier level is present, the carrier from unit 16 is rectified across the diode resistor 49. Since the normal limited carrier level is unvarying in amplitude, the D. C. resulting from its rectification across resistor 49 is unvarying, and is blocked from the rest of the circuit by capacitor 53. However, if the carrier drops in level (due to a weak signal), and becomes noisy, the noise inherently has variations of level. Such variations of level in the noise are quite large, and exist even at the output of limiter 16, due in part perhaps to the noise going down through zero level, where it cannot be affected by the limiter. Therefore, the D. C. across resistor 49 will also have variations of level. These variations will be passed by capacitor 53 to the low frequency noise amplifier tube 22, where they will be amplified. Thence, they are passed on, by way of a transformer 57 connected to the anode circuit of tube 22, to the anode of a vacuum diode 23, which is the low frequency noise amplifier.

A resistor 58 is connected from the cathode of diode 23 to ground. A low pass filter, comprising a pair of shunt capacitors 59 and 60 separated by a resistor 61, is connected to the cathode of diode 23, essentially across diode load resistor 58. To complete the circuit, the common junction point of resistor 61 and capacitor 60 is connected to grid 39 of squelch tube 24.

The amplified noise variations applied by means of transformer 57 to diode 23, rectified across diode resistor 58, produce a unidirectional voltage of positive polarity, which passes through the low pass filter 59—61 to the grid 39 of squelch tube 24 to produce squelch action by such tube. In this connection, it may be recalled that the application of a positive voltage to grid 39 results in the cutting off of the carrier coupling tube or amplifier tube 17. Filter 59—61 allows only extremely-low-frequency or zero-frequency (D. C.) components to be passed on to tube 24.

Stated in another way, it may be said that the diode 24 and its associated circuit (elements 48 to 52) detects any level variations appearing in the output of the carrier amplifier and limiter unit 16 and passes these variations on to the amplifier tube 22 through capacitor 53. These amplified variations are then rectified by diode 23 across its load resistor 58 to produce thereacross a unidirectional voltage of positive polarity which operates on the grid 39 of tube 24 to produce squelch action by such tube.

To summarize, tubes 24 and 43 with their associated circuit elements 36, 38, 40, 41, 44 and 47 constitute means for applying a squelch or cutoff bias to the carrier amplifier tube 17. Diode 21, amplifier tube 22, diode 23, and the associated circuit elements 48 to 53 and 55 to 61 constitute means for producing a D. C. voltage in response to any noise that may appear in the carrier amplifier and limiter output, and for applying this voltage to the squelch circuit so as to cause it to squelch the carrier amplifier tube 17.

It is desirable to have the AFC squelch operate not only when the carrier dips into the noise, as previously described, but also if there is an interfering signal which is close enough to the desired carrier to get through the carrier filter 11. The circuit of this invention will operate to squelch the AFC operation if an interfering signal appears along with the desired carrier in the output filter 11, at or near the carrier level. This occurs because in this event there will be produced an amplitude variation of the resultant or beat applied to transformer 48, which the amplitude variation detector 21, 49 etc. will detect and pass on to the rectifier tube 23. There, it will be rectified to produce the positive voltage needed to operate the squelch tube 24.

Although the circuit of this invention has been described in connection with a phase comparator type of AFC system, it will work equally well in conjunction with any AFC system wherein the squelch circuit requires application of a positive or negative voltage to produce AFC squelch action.

What is claimed is:

1. In a receiver receptive of sideband intelligence and also a carrier signal, a carrier filter for separating out the carrier signal from the composite received signal, an amplifier and limiter coupled to the output of said filter, a local heterodyning oscillator in said receiver for determining the frequency of said separated carrier signal, an automatic frequency control circuit coupled to the output of said amplifier and limiter and normally operating to maintain the frequency of said oscillator at a value such that said separated carrier signal has substantially a predetermined frequency, and means responsive to variations in the amplitude level of the separated, amplified, and limited carrier signal for opening the coupling between said frequency control circuit and the amplifier and limiter output, thereby rendering ineffective said frequency control circuit.

2. In a receiver receptive of sideband intelligence and also a carrier signal, means for separating out the carrier signal from the composite received signal, a local heterodyning oscillator in said receiver for determining the frequency of said separated carrier signal, an automatic frequency control circuit coupled to said separating means and normally operating to maintain the frequency of said oscillator at a value such that said separated carrier signal has substantially a predetermined frequency, an amplitude modulation detector coupled to said separating means and acting to develop a low frequency voltage in response to variations in the amplitude level of said separated carrier signal, means for rectifying said low frequency voltage to develop therefrom a unidirectional voltage, and means for utilizing said unidirectional voltage to open the coupling between said frequency control circuit and said separating means.

3. In a receiver receptive of sideband intelligence and also a carrier signal, a carrier filter for separating out the carrier signal from the composite received signal, an amplifier and limiter coupled to the output of said filter, a local heterodyning oscillator in said receiver for determining the frequency of said separated carrier signal, an automatic frequency control circuit coupled to the output of said amplifier and limiter and normally operating to maintain the frequency of said oscillator at a value such that said separated carrier signal has substantially a predetermined frequency, an amplitude modulation detector coupled to the output of said amplifier and limiter and acting to develop a voltage in response to variations in the amplitude level of the separated, amplified, and limited carrier signal, and means for utilizing said voltage to cause opening of the coupling between said frequency control circuit and the amplifier and limiter output.

4. In a receiver receptive of sideband intelligence and also a carrier signal, a carrier filter for separating out the carrier signal from the composite received signal, an amplifier and limiter coupled to the output of said filter, a local heterodyning oscillator in said receiver for determining the frequency of said separated carrier signal, an automatic frequency control circuit coupled to the output of said amplifier and limiter and normally operating to maintain the frequency of said oscillator at a value such that said separated carrier signal has substantially a predetermined frequency, an amplitude modulation detector coupled to the output of said amplifier and limiter and acting to develop a low frequency voltage in response to variations in the amplitude level of the separated, amplified, and limited carrier signal, means for rectifying said low frequency voltage to develop therefrom a unidirectional voltage, and means for utilizing said unidirectional voltage to open the coupling between said frequency control circuit and the amplifier and limiter output.

5. In a receiver receptive of sideband intelligence and also a carrier signal, means for separating out the carrier signal from the composite received signal, a local heterodyning oscillator in said receiver for determining the frequency of said separated carrier signal, a controllable amplifier receptive of said separated carrier signal, an automatic frequency control circuit coupled to the output of said amplifier and normally operating to maintain the frequency of said oscillator at a value such that said separated carrier signal has substantially a predetermined frequency, and means responsive to variations in the amplitude level of said separated carrier signal for disabling said amplifier, thereby rendering ineffective said frequency control circuit.

6. In a receiver receptive of sideband intelligence and also a carrier signal, means for separating out the carrier signal from the composite received signal, a local heterodyning oscillator in said receiver for determining the frequency of said separated carrier signal, a controllable amplifier receptive of said separated carrier signal, an automatic frequency control circuit coupled to the output of said amplifier and normally operating to maintain the frequency of said oscillator at a value such that said separated carrier signal has substantially a predetermined frequency, an amplitude modulation detector coupled to said separating means and acting to develop a voltage in response to variations in the amplitude level of said separated carrier signal, and means for utilizing said voltage to cause disabling of said amplifier.

7. In a receiver receptive of sideband intelligence and also a carrier signal, means for separating out the carrier signal from the composite received signal, a local heterodyning oscillator in said receiver for determining the frequency of said separated carrier signal, a controllable amplifier receptive of said separated carrier signal, an automatic frequency control circuit coupled to the output of said amplifier and normally operating to maintain the frequency of said oscillator at a value such that said separated carrier signal has substantially a predetermined frequency, an amplitude modulation detector coupled to said separating means and acting to develop a low frequency voltage in response to variations in the amplitude level of said separated carrier signal, means for rectifying said low frequency voltage to develop a unidirectional voltage therefrom, and means for utilizing said unidirectional voltage to cause disabling of said amplifier.

8. In a receiver receptive of sideband intelligence and also a carrier signal, a carrier filter for separating out the carrier signal from the composite received signal, an amplifier and limiter coupled to the output of said filter, a local heterodyning oscillator in said receiver for determining the frequency of said separated carrier signal, a controllable amplifier having its input coupled to the output of said amplifier and limiter, an automatic frequency control circuit coupled to the output of said controllable amplifier and normally operating to maintain the frequency of said oscillator at a value such that said separated carrier signal has substantially a predetermined frequency, an amplitude modulation detector coupled to the output of said amplifier and limiter and acting to develop a low frequency voltage in response to variations in the amplitude level of the separated, amplified, and limited carrier signal, means for rectifying said low frequency voltage to develop therefrom a unidirectional voltage, and means for utilizing said unidirectional voltage to cause disabling of said amplifier.

9. In a receiver receptive of sideband intelligence and also a carrier signal, means for separating out the carrier signal from the composite received signal, a local heterodyning oscillator in said receiver for determining the frequency of said separated carrier signal, a phase comparator having two inputs and an output, means coupling one of said inputs to said separating means, a reference oscillator coupled to the other of said inputs, means coupled to said output for controlling the frequency of said oscillator, and means responsive to variations in the amplitude level of said separated carrier signal for opening the coupling between said one input and said separating means, thereby disabling said phase comparator.

10. In a receiver receptive of sideband intelligence and also a carrier signal, a carrier filter for separating out the carrier signal from the composite received signal, an amplifier and limiter coupled to the output of said filter, a local heterodyning oscillator in said receiver for determining the frequency of said separated carrier signal, a phase comparator having two inputs and an output, means coupling one of said inputs to the output of said amplifier and limiter, a reference oscillator coupled to the other of said inputs, means coupled to the comparator output for controlling the frequency of said oscillator, and means responsive to variations in the amplitude level of the separated, amplified, and limited carrier signal for opening the coupling between said one input and the amplifier and limiter output, thereby disabling said phase comparator.

11. In a receiver receptive of sideband intelligence and also a carrier signal, means for separating out the carrier signal from the composite received signal, a local heterodyning oscillator in said receiver for determining the frequency of said separated carrier signal, a phase comparator having two inputs and an output, means coupling one of said inputs to said separating means, a reference oscillator coupled to the other of said inputs, means coupled to said output for controlling the frequency of said oscillator, an amplitude modulation detector coupled to said separating means and acting to develop a voltage in response to variations in the amplitude level of said separated carrier signal, and means for utilizing said voltage to cause opening of the coupling between said one input and said separating means, thereby disabling said phase comparator.

12. In a receiver receptive of sideband intelligence and also a carrier signal, means for separating out the carrier signal from the composite received signal, a local heterodyning oscillator in said receiver for determining the frequency of said separated carrier signal, a phase comparator having two inputs and an output, means coupling one of said inputs to said separating means, a reference oscillator coupled to the other of said inputs, means coupled to said output for controlling the frequency of said oscillator, an amplitude modulation detector coupled to said separating means and acting to develop a low frequency voltage in response to variations in the amplitude level of said separated carrier signal, means for rectifying said low frequency voltage to develop therefrom a unidirectional voltage, and means for utilizing said unidirectional voltage to open the coupling between said one input and said separating means, thereby disabling said phase comparator.

13. In a receiver receptive of sideband intelligence and also a carrier signal, a carrier filter for separating out the carrier signal from the composite received signal, an amplifier and limiter coupled to the output of said filter, a local heterodyning oscillator in said receiver for determining the frequency of said separated carrier signal, a phase comparator having two inputs and an output, means coupling one of said inputs to the output of said amplifier and limiter, a reference oscillator coupled to the other of said inputs, means coupled to the comparator output for controlling the frequency of said oscillator, an amplitude modulation detector coupled to the output of said amplifier and limiter and acting to develop a voltage in response to variations in the amplitude level of the separated, amplified, and limited carrier signal, and means for utilizing said voltage to cause opening of the coupling between said one input and the amplifier and limiter output, thereby disabling said phase comparator.

14. In a receiver receptive of sideband intelligence and also a carrier signal, a carrier filter for separating out the carrier signal from the composite received signal, an amplifier and limiter coupled to the output of said filter, a local heterodyning oscillator in said receiver for determining the frequency of said separated carrier signal, a phase comparator having two inputs and an output, means coupling one of said inputs to the output of said amplifier and limiter, a reference oscillator coupled to the other of said inputs, means coupled to the comparator output for controlling the frequency of said oscillator, an amplitude modulation detector coupled to the output of said amplifier and limiter and acting to develop a low frequency voltage in response to variations in the amplitude level of the separated, amplified, and limited carrier signal, means for rectifying said low frequency voltage to develop therefrom a unidirectional voltage, and means for utilizing said unidirectional voltage to open the coupling between said one input and the amplifier and limiter output, thereby disabling said phase comparator.

References Cited in the file of this patent

UNITED STATES PATENTS

| | | |
|---|---|---|
| 2,066,528 | Harper | Jan. 5, 1937 |
| 2,513,786 | Crosby | July 4, 1950 |
| 2,691,097 | Atwood | Oct. 5, 1954 |

FOREIGN PATENTS

| | | |
|---|---|---|
| 728,773 | Germany | Dec. 3, 1942 |